Patented Mar. 17, 1936

2,034,056

UNITED STATES PATENT OFFICE 2,034,056

CASEIN MANUFACTURING PROCESS

David D. Peebles, Eureka, Calif., assignor to Western Condensing Company, San Francisco, Calif., a corporation of California No Drawing. Application June 18, 1932,
Serial No. 618,024

2 Claims. (Cl. 99—11)

This invention relates generally to processes for the commercial manufacture of casein from materials such as skim milk, and to products resulting from such processes.

In the past, several processes have been utilized for the manufacture of casein from skim milk. All of these processes are characterized by the production of casein in the form of agglomerated masses or curds, before the steps of drying and grinding. These masses may be relatively large, (as in the self-sour or lactic acid process, the older types of hydrochloric and sulphuric acid processes, or the rennet process) or on the order of granules (as in the grain curd process). To reduce casein in these forms to dry powdered material, tunnel dryers and grinding must be utilized.

Aside from the manufacturing costs involved in processes of the above character, which are relatively high compared to the process described herein, the resulting product is not all that may be desired. Solubility of the dry product is adversely affected by the heat treatment to which it is subjected, and it is difficult to secure uniformity of quality. Since the casein product is generally utilized in subsequent industrial processes in which the casein is placed in solution, it is evident that high solubility and uniform quality are attributes to be desired.

It is an object of the present invention to devise an improved process for the commercial manufacture of dry powdered casein which will materially reduce its cost of manufacture and which will result in a novel product of relatively high quality. The process is characterized by the fact that at no time are agglomerated masses of casein formed, and also by the fact that special shredding apparatus, relatively slow operating dryers and grinding apparatus need not be employed. As will be presently explained, the resulting product is characterized by relatively high solubility.

It is a further object of the invention to devise a casein manufacturing process which can produce a product having a desired amount of whey solids such as milk sugar together with casein in divided form.

Further objects of the invention will appear from the following description in which the preferred embodiments of the invention have been set forth in detail. It is to be understood that the appended claims are to be accorded a range of equivalents consistent with the state of the prior art.

In my process certain reagents, as for example hydrochloric or sulphuric acids, are utilized for effecting precipitation of casein from skim milk, but as distinguished from prior practice, I so carry out the reaction that relatively fine casein particles are precipitated. In carrying out one embodiment of my process, a quantity of skim milk is placed in a suitable vessel equipped with mechanical agitating means, as for example a rotatable impeller. The skim milk is then heated to a temperature relatively low compared to temperatures employed in the past for coagulating casein by the use of acids. Good results are secured by utilizing a temperature of from 78° to 80° F. The heated mass is then violently agitated by driving the impeller. While the mass is being violently agitated, a suitable mineral acid, as for example hydrochloric or sulphuric, is slowly added. It is preferable to add this acid in relatively dilute form, as for example one part hydrochloric acid to ten parts of water, or one part of sulphuric acid to forty parts of water.

Within a relatively short time, a reaction takes place in which casein is precipitated as a fine slime or slurry, substantially free from agglomerated curd masses. Upon substantial completion of the reaction, agitation is arrested and the slime or slurry removed apart from the main body of liquor, which is largely whey. Such separation can be by well known methods, such as by centrifuging, or by permitting the slurry to settle by gravity, after which the liquor in the upper portion of the vessel can be decanted off.

When it is desired to produce casein in relatively pure form, the casein remaining in the vessel is then removed and washed to effect further removal of whey and precipitating agent. Either fresh or acidulated water can be used for washing.

In place of washing as described above, the fine casein slurry recovered from the precipitating vessel may be first centrifuged to effect concentration of the casein and then mixed or repulped with wash water and again concentrated by centrifuging. Such treatment can be repeated a number of times to secure the desired degree of purity.

Whatever method is utilized for washing and purifying the casein, the casein produced at this point in the process is relatively finely divided solid in suspension in water. I have found that in this condition, it may be passed through the atomizer or spray nozzle of a spray dryer. Therefore, to effect drying to form a powder, I pass the material through a suitable spray type desiccator, as for example, one having a centrifugal atomizer, such as is employed for the desiccation of milk. As is well known, in spray type desiccators, the liquid carrying the material being desiccated is atomized, and the atomized particles are suspended in hot drying gas to effect desiccation. The powdered product recovered from the desiccator is apparently dry, although it still contains a certain amount of moisture, depending upon the temperature of the outgoing drying medium.

As will be evident from the above, an important phase of the invention is to so treat the skim milk, that a fine casein suspension is produced which can be subsequently thoroughly washed and passed through a spray type desiccator. It has been found that with the use of mineral acid if the temperature of reaction is greatly in excess of 85° F., relatively large agglomerated curd masses tend to form, and the process tends to become critical with respect to control of the acid concentration and agitation, depending somewhat upon the lactic acid concentration of the milk. A temperature somewhat less than 78° F. might be employed, with the objection, however, that the speed of the reaction will be materially reduced. A lesser amount of acidulation reduces the speed of reaction, unless higher reacting temperatures are employed. A greater amount of acidulation requires a lower reacting temperature to prevent formation of relatively large agglomerated curd masses, and also has the disadvantage that the acid remaining with the casein may be difficult to remove, and may appear in the finished product. Whatever mineral acid is utilized, and whatever may be the natural acid content of the skim milk, the hydrogen ion concentration of the material to effect proper reaction is preferably about pH 4.6, expressed in Sorensen's units.

In the modification of my process the casein is precipitated in the form of finely divided solid particles by the use of material like rennet, instead of a mineral acid. Rennet has been utilized in the past to effect precipitation of casein, but as heretofore employed, large agglomerated curd masses have been formed. I have found that if prior to adding rennet, the skim milk is heated to the temperature of about 130° F. and then cooled, the subsequent addition of rennet accompanied by violent agitation will cause casein to be precipitated in the form of finely divided particles. Thus in carrying out my process with rennet, the skim milk is heated to a temperature of about 130° F., and is then permitted to cool to about atmospheric temperature. A suitable amount of rennet diluted with water is then added while the skim milk is being violently agitated. Agitation is continued until the precipitation of casein is substantially completed. The amount of rennet employed will depend somewhat upon its effective strength, and upon the freshness of the milk. The size of the precipitated particles is not critical with respect to character or amount of rennet, or with respect to the temperature of the milk while precipitation is in progress, although agitation is apparently essential. The precipitate obtained by the use of rennet can then be washed as by the steps previously described, and is then passed through a spray type desiccator to form a dry casein powder.

Due to the absence of heat treatment of the character employed in prior processes for the manufacture of casein, my final product is characterized by relatively high and quick solubility in proper solutions. No case-hardening of the particles occurs either in the precipitating or in the spray drying steps, and the particles of the final product have a relatively large surface area to promote dissolution.

It is apparent that certain modifications of my process can be made without departing from the spirit of the invention. For example, if a relatively pure product is not required, the settled or partially separated fine casein precipitate can be immediately introduced into the spray type desiccator. Before being introduced into the spray type desiccator, the casein may or may not be concentrated or dewatered, although dewatering at this point lowers the cost of desiccation.

When it is desired to utilize the product produced by my process as a food for live stock or human consumption, the treatment following precipitation and prior to desiccation, can be so conducted as to permit a predetermined amount of milk sugar to remain with the casein in the final product. Thus centrifuging can be carried out with suitable apparatus, to produce an underflow consisting of both casein and milk sugar, and by regulating the character of the centrifuge treatment, the percentage of milk sugar in the final product can be regulated. After desiccation of such an underflow in a spray type desiccator, the product can be rendered nonhygroscopic by converting the anhydrous milk sugar to crystalline form.

I claim:

1. In a process for the commercial manufacture of casein from skim milk, the steps of first heating the skim milk to a temperature of about 130° F., then cooling to about atmospheric temperature, then effecting precipitation of casein from the cooled skim milk by the addition of rennet while the skim milk is being violently agitated whereby the precipitation consists of finely divided casein particles, and then spray drying the resulting precipitate.

2. In a process for the commercial manufacture of casein from skim milk, the steps of first heating the skim milk to a temperature of about 130° F., then cooling to about atmospheric temperature, and then effecting precipitation of finely divided casein from the cooled skim milk by the addition of rennet while the skim milk is being agitated.

DAVID D. PEEBLES.